Oct. 28, 1958     H. W. MULCAHY     2,858,030
FRICTION SHOCK ABSORBING MECHANISMS
Filed June 8, 1953     2 Sheets-Sheet 1
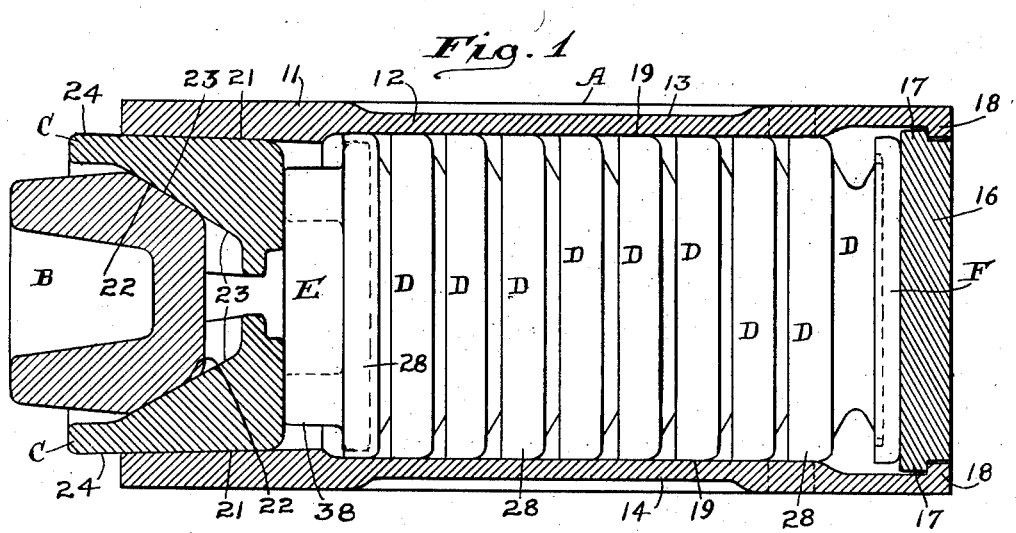
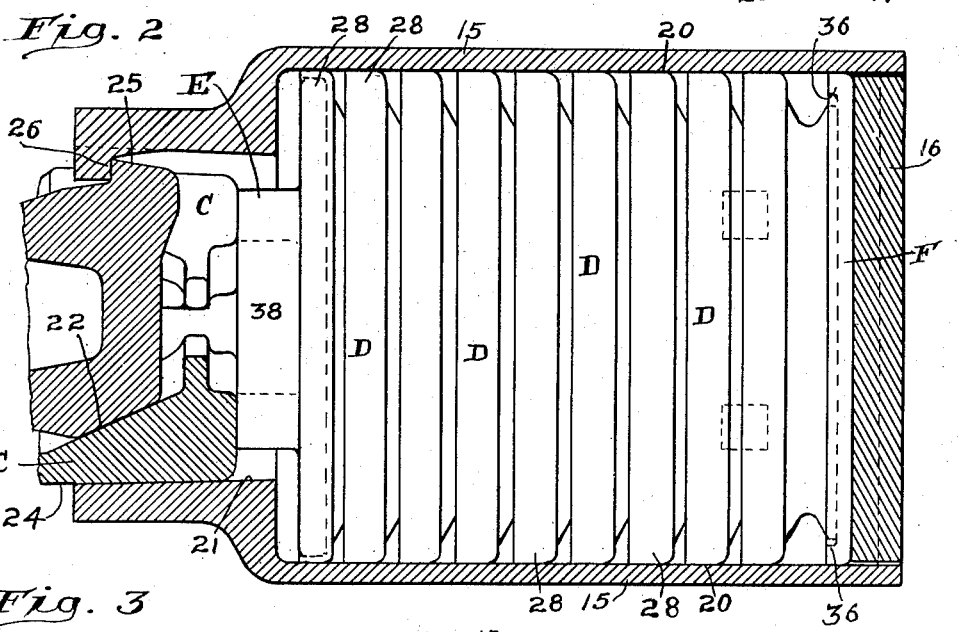
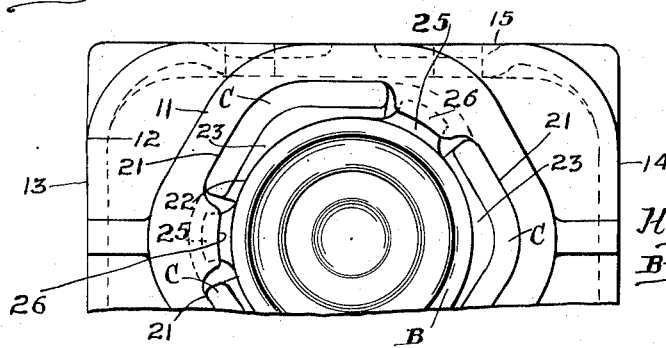
Inventor:
Harry W. Mulcahy.
By Henry Fuchs
Atty.

Oct. 28, 1958 H. W. MULCAHY 2,858,030
FRICTION SHOCK ABSORBING MECHANISMS
Filed June 8, 1953 2 Sheets-Sheet 2
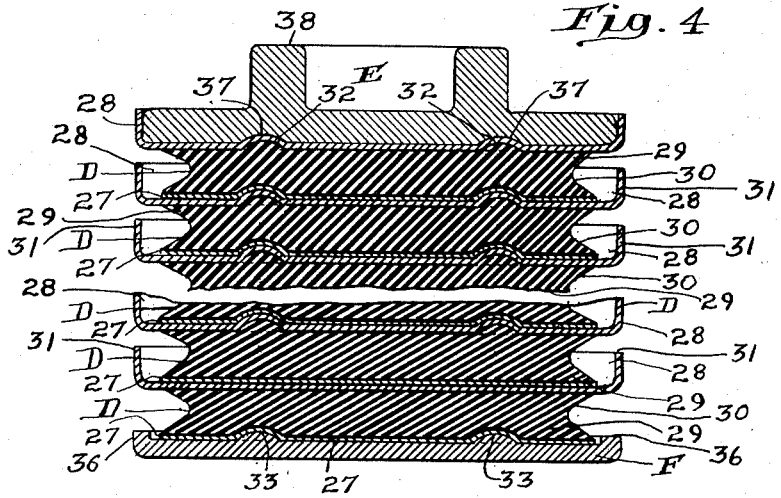
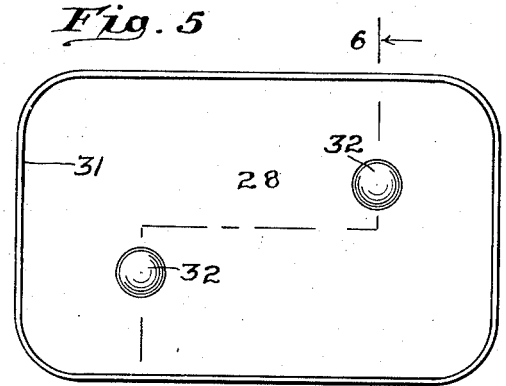
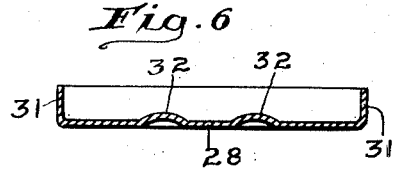
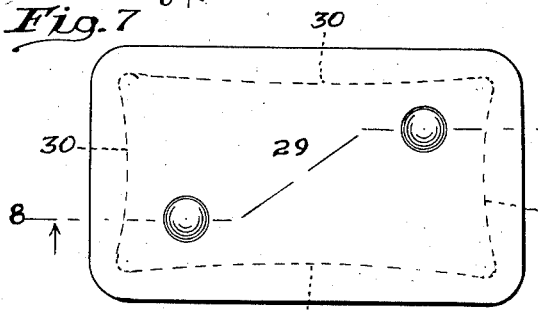
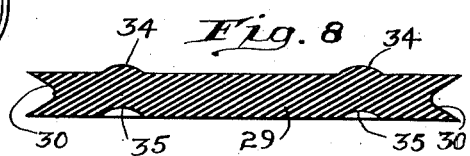
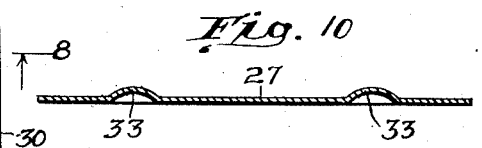
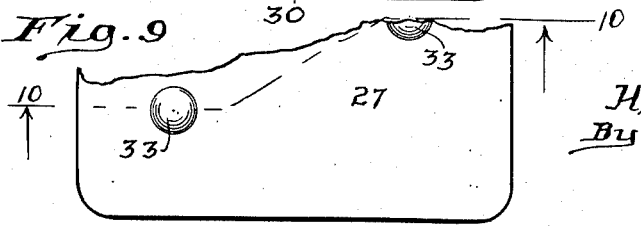
Inventor:
Harry W. Mulcahy.
By Henry Fuchs
Atty.

United States Patent Office 2,858,030
Patented Oct. 28, 1958

2,858,030
FRICTION SHOCK ABSORBING MECHANISMS

Harry W. Mulcahy, Chicago, Ill., assignor to W. H. Miner, Inc., Chicago, Ill., a corporation of Delaware Application June 8, 1953, Serial No. 360,314

2 Claims. (Cl. 213—45)

This invention relates to improvements in friction shock absorbing mechanisms.

One object of the invention is to provide a high capacity shock absorbing mechanism, comprising a friction casing, friction shoes slidingly telescoped within the casing, a wedge block in wedging engagement with the shoes, and yielding means within the casing opposing movement of the shoes inwardly of the casing, wherein the yielding means comprises a column of units, each composed of a pair of metal plates and a rubber pad interposed between and bonded to the plates, and wherein one of the metal plates of each unit is provided with a peripheral flange which is arranged to bear on the interior walls of the casing to maintain the unit centered within the casing and guide the same in lengthwise direction with respect to the casing.

A further object of the invention is to provide a mechanism, as set forth in the preceding paragraph, wherein the flanged plates of each of the units of the column forming the yielding means has the flanges thereof extending outwardly beyond said unit in overhanging relation with respect to the next adjacent unit of said column, thereby stabilizing the column of units against bending and snaking.

A more specific object of the invention is to provide a cushioning means composed of a column of rubber units, each comprising a flanged pan-shaped metal plate, a plain flat metal plate, and a rubber pad interposed between the plates and bonded or vulcanized thereto, wherein the units of the column are arranged in said column with the pan-shaped and plain flat plates on corresponding sides thereof so that the pan-shaped plate of each of said units overhangs the plain flat plate of the adjacent unit, as well as a portion of the rubber pad of said last named unit, thereby protecting the rubber pad against damage.

Other objects of the invention will more clearly appear from the description and claims hereinafter following.

In the accompanying drawings forming a part of this specification,

Figure 1 is a longitudinal, vertical sectional view of my improved friction shock absorbing mechanism, showing the column of cushioning units in side elevation.

Figure 2 is a horizontal longitudinal sectional view, showing the column of cushioning units in side elevation.

Figure 3 is a front end elevational view, partly broken away, of the mechanism shown in Figure 1.

Figure 4 is a broken, longitudinal sectional view of the column of cushioning units and associated follower plates of my improved mechanism.

Figure 5 is a top plan view of the pan-shaped plate member of one of the cushioning units shown in Figure 4.

Figure 6 is a transverse sectional view, corresponding substantially to the irregular line 6—6 of Figure 5.

Figure 7 is a plan view of the rubber pad employed in one of the cushioning units shown in Figure 4.

Figure 8 is a longitudinal sectional view, corresponding substantially to the irregular line 8—8 of Figure 7.

Figure 9 is a plan view of the plain flat plate of one of the cushioning units shown in Figure 4.

Figure 10 is a longitudinal sectional view, corresponding substantially to the irregular line 10—10 of Figure 9.

As shown in the drawings, my improved friction shock absorbing mechanism comprises broadly a casing A, a wedge block B, three friction shoes C—C—C, a plurality of rubber cushioning units D—D—D, and front and rear follower plates E and F.

The casing A comprises a friction shell section 11 at the front end and a cage portion 12 rearwardly of the shell section 11. The cage portion 12 of the casing A is in the form of a rectangular boxlike member, having longitudinally extending, vertically spaced, top and bottom walls 13 and 14, and longitudinally extending, laterally spaced, vertical side walls 15—15. The rear end of the cage portion 12 is closed by a removable wall 16 of rectangular shape, having top and bottom flanges 17—17 engaged in back of inturned ribs or flanges 18—18 on the top and bottom walls 13 and 14 of the casing. The top and bottom walls 13 and 14 present longitudinally extending, interior, flat faces forming top and bottom, interior guides 19—19. The guides 19—19 extend from the front end to within a short distance of the rear end of the cage portion 12 of the casing, as clearly shown in Figure 1. The vertical side walls 15—15 of the casing A also present longitudinally extending, interior, flat faces, which form parallel opposed side guides 20—20.

The friction shell section 11 of the casing A is continuous with the cage portion 12, but of lesser width than the latter and of hexagonal, transverse cross section. The hexagonal shell section 11 presents three longitudinally extending, interior friction surfaces 21—21—21, which converge inwardly of said shell section.

The wedge block B is disposed at the open front end of the casing A and has wedging engagement with the three friction shoes C—C—C, which are interposed between the wedge block and the friction surfaces 21—21—21 of the friction shell section 11 of the casing.

The wedge block B and the shoes C have cooperating wedge faces 22 and 23, respectively, and the shoes C have lengthwise extending friction surfaces 24 on their outer sides in sliding engagement with the friction surfaces 21 of the casing. The wedge block B is limited against outward movement with respect to, and held assembled with, the casing A by retaining lugs 25 at the inner end of the block engaged in back of inturned stop lugs 26 at the outer end of the friction shell section 11.

The cushioning units D—D—D are disposed within the cage portion 12 of the casing A in back of the friction shoes C and form a resilient column, providing yielding means for opposing inward movement of the shoes. Each cushioning unit D comprises a flat metal plate 27, a pan-shaped metal plate 28, and a rubber pad 29 interposed between the plates 27 and 28 and bonded or vulcanized to the same. The rubber pad 29 of each unit D is of substantially rectangular shape with rounded corners, as clearly shown in Figure 7, and has its edges indented or grooved, as indicated at 30, as shown most clearly in Figures 4 and 7, to accommodate the flow of the material of the pad when compressed, thereby preventing the material of the pad from being squeezed outwardly to an extent to bulge beyond the plates 27 and 28 and thus be subjected to the danger of being damaged.

The plate 27 of each unit is in the form of a plain flat rectangular member of substantially the same outline and size as the pad 29 and has its edges flush with the edges of the latter. The pan-shaped plate 28 of each unit is secured to the side of the pad 29 opposite to that which the plate 27 is secured and is also of substantially rectangular outline but of greater size than the plate 27 and the pad 29, so that it protrudes beyond the latter on all sides, as clearly shown in Figures 2, 3 and 4. The pan-shaped plate 28 is of greater thickness than the plate 27 and has a laterally extending, peripheral flange 31, which extends entirely around the plate and projects in a direction away from the pad to which it is secured.

The cushioning units D—D—D, when assembled in column formation to provide the yielding cushioning or spring means for the shock absorbing mechanism, are nested or telescoped with each other, that is, the pad 29 and the plate 27 of each unit D is engaged within the pan-shaped plate 28 of the adjacent unit with the plate 27 of the first named unit directly bearing on the plate 28 of the second named unit. Each of the units D has centering projections 32—32 on the plate 28 and centering seats 33—33 in the plate 27 thereof, the projections 32—32 and the seats 33—33 of adjacent units being interengaged to center and align the units of the column and effectively prevent endwise relative displacement of the units of said column. The projections 32—32 and the seats 33—33 are in the forms of embossments on the plates 27 and 28, and the rubber pad 29 of each unit has projections 34 on the side thereof to which the plate 28 is bonded, fitting in the hollow side of the projections 32—32 of said plate, and the opposite sides of said rubber pad is recessed, as indicated at 35—35, to provide seats which accommodate the projecting portions of the embossed seats 33—33 of the plate 27. The pan-shaped plates 28—28 of the units D—D are of such a size that they have a sliding fit between the top, bottom, and side guides 19—19 and 20—20 presented by the top, bottom, and side walls 13, 14, and 15—15 of the casing A, the flanges 31—31 of these pan-shaped plates presenting lengthwise extending, flat guide surfaces of substantial length to keep said plates and units, of which they form parts, from tilting.

The rear follower plate F, which is of rectangular outline, is interposed between the unit D at the rear end of the column of units and the end wall 16 of the casing. The follower F is provided with a relatively shallow, peripheral flange 36, extending entirely around the same, which forms a seat in which the plate 27 of the rearmost unit D of the column is accommodated.

The front follower plate E is of substantially rectangular outline and is interposed between the unit D at the front end of the column of units and the shoes C—C—C, the same being seated in the pan-shaped plate 28 of said unit and having recesses, as indicated at 37—37, in its rear side to accommodate the centering projections 32—32 of said plate 28. This follower plate E is provided with a forwardly projecting, cylindrical boss 38, which extends into the friction shell section 11 of the casing A and bears on the inner ends of the shoes C—C—C.

The operation of my improved friction shock absorbing mechanism is as follows: During compression of the mechanism, the wedge block B is forced inwardly of the casing, spreading the shoes C—C—C apart and sliding the same inwardly along the friction surfaces 21—21—21, resisted by the rubber units D—D—D. Exceptionally high frictional resistance is produced during this action, due to the high shock absorbing capacity of the rubber units D—D—D which have the metal plates thereof bonded or vulcanized to the rubber pads. The parts of the mechanism are so designed and proportioned that the front follower of the draft rigging, not shown, does not at any time in service go solid against the casing A, the pressure at all times being transmitted through the column of rubber units.

When the actuating force is reduced, the resilient rubber units D—D—D expand in direction lengthwise of the mechanism, thus forcing the shoes C—C—C and the wedge block B outwardly, returning the same to the full release positions shown in Figures 1 and 2, outward movement of the wedge block B being arrested by engagement of the lugs 25 with the lugs 26 of the casing A.

In this connection it is pointed out that the interengaging centering projections and seats of the units D—D—D and the interengaging portions of the front follower E and front unit D and of the rear follower F and the rear unit D, hold the followers E and F and the units D—D—D composing the resilient column in aligned relation, assisted by the pan-shaped plates 28—28—28, the latter further stabilizing the column of units against snaking or buckling, which might otherwise occur due to the inherent plastic character of rubber, the plates 28 being positively guided and held against both lateral and vertical displacement to restrain the units D—D—D, of which the plates form parts and to the rubber pads to which they are bonded, against both lateral and vertical dislocation.

I claim:

1. In a shock absorbing mechanism, the combination with a casing; of a resilient column within the casing, said column including a plurality of rubber cushioning units arranged in series and disposed at right angles to the axis of the column, each unit including a first metal plate, rigid flanges projecting from the edges of said plate on one side thereof at right angles thereto, a second flat metal plate of smaller dimension than the first plate and centered with respect thereto, and a solid rubber pad of overall dimension the same as that of the second plate interposed between said plates and bonded thereto, adjacent units being nested with the second metal plate side of each of said adjacent units engaged within the flanges of said first plate of the adjacent unit of said column, with the second metal plate thereof seated on said flanged plate the edges of said rubber pads being formed concavely to provide spaces within the flanges in which the pad is nested, which spaces have volume sufficient to accept rubber displaced from the pad as the column is compressed sufficiently to engage the flanges of one unit with the first plate of the adjacent unit and said flanges fitting the interior of the casing for sliding movement lengthwise thereof.

2. In a shock absorbing mechanism, the combination with top, bottom, and side guides; of a resilient column between said top, bottom, and side guides, said column including a plurality of rubber cushioning units arranged in series with units disposed at right angles to the axis of the column, each unit including a first metal plate, flanges projecting at right angles from one face of said plate at the edges thereof, a second metal plate of smaller dimensions than the first plate and disposed parallel thereto and spaced therefrom, a solid rubber pad interposed between said plates and bonded thereto, adjacent units being nested with the second metal plate side of each of said adjacent units engaged within the flanges of the first plate of the adjacent unit of said column, with the second metal plate thereof seated on said first plate, said plates having interengaging centering projections and seats for maintaining the units centered with respect to each other, the flanges of said units fitting between said guides for sliding movement lengthwise thereof, thereby to maintain the units at right angles to the axis of the column.

References Cited in the file of this patent

UNITED STATES PATENTS

| 1,828,063 | Mussey | Oct. 20, 1931 |
| 2,165,383 | Johnson et al. | July 11, 1939 |
| 2,486,741 | Gabriel | Nov. 1, 1949 |
| 2,559,743 | Williams | July 10, 1951 |
| 2,588,488 | Dath | Mar. 11, 1952 |
| 2,598,762 | Dath | June 3, 1952 |
| 2,640,603 | Willison et al. | June 2, 1953 |
| 2,649,213 | Withall | Aug. 18, 1953 |
| 2,713,485 | Tillou | July 19, 1955 |

FOREIGN PATENTS

| 762,631 | France | Jan. 22, 1934 |